United States Patent Office 3,741,746
Patented June 26, 1973

3,741,746
METHOD OF REGULATING PLANT GROWTH
Richard J. Marrese, Wyckoff, Gordon C. Edwards, Cranford, and James Zielinski, Kenilworth, N.J., assignors to Esso Research and Engineering Company
No Drawing. Filed Nov. 12, 1969, Ser. No. 876,144
Int. Cl. A01n 9/12
U.S. Cl. 71—72                                                           4 Claims

ABSTRACT OF THE DISCLOSURE

Semicarbazides, especially the tetraalkylated thiosemicarbazides and biuret derivatives, especially the mono- and dithiobiuret derivatives have demonstrated effective growth regulating activity. Exemplary or preferred semicarbazides are those having the formula:

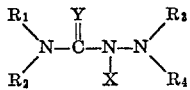

where $R_1$ and $R_4$ each represent an unsubstituted or substituted $C_1$–$C_{30}$ hydrocarbyl group, preferably $C_1$–$C_{10}$, and X can be either hydrogen, said unsubstituted or substituted hydrocarbyl group, and Y can be O or S.

Exemplary of preferred biuret derivatives are those having the formula:

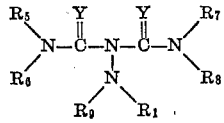

where $R_5$–$R_{10}$ can be H, unsubstituted or substituted $C_1$–$C_{30}$ hydrocarbyl group, preferably $C_1$–$C_{10}$, and Y can be O or S, and combinations thereof. Typical $R_1$–$R_{10}$ hydrocarbyl groups include: (1) saturated or unsaturated, acyclic or cyclic, aliphatics such as, e.g., ethyl, propargyl, cyclohexyl, cyclohexenyl, etc.; and (2) aromatic or heteroaromatic radicals, such as phenyl, pyridyl, etc.

---

This invention relates to the use of tetra-substituted thiosemicarbazides, as well as monothiobiuret and dithiobiuret derivatives as growth regulants.

In one aspects, this invention relates to the use of the aforesaid compounds as fruit thinning agents. In another aspect, this invention relates to the use of the aforesaid compounds as plant growth regulants. In yet another aspect, this invention relates to the use of the aforesaid compounds as crop harvest aids.

The broad class of growth regulants are those compounds having an ability to regulate vegetative, flowering and fruiting characteristics of crops produced throughout the world. With growth regulators, it is now possible to chemically control and alter the physiological processes in the growing crop; which up until the advent of such technology could only be triggered by natural and climatic conditions. Thus, it is possible to produce crops of higher quality and with greater flexibility in harvesting procedures. Various theories have been proposed for explaining the mechanisms of chemical growth regulants such as, they prevent fertilization of freshly opened flowers by inducing an incompatible condition between the stylar tissue and the pollen tubes. Another theory is that a crop is thinned because of an increased drop in young fruitlets due to accelerated ethylene generation by the particular treatment. Developing fruitlets on weak spurs for food supply possess the most resistance to the chemical treatment.

Whatever may be the actual mechanism involved in chemical fruit thinning or in the removal of unwanted growth for particular plants, or in the abscission of the fruit when the plant matures thereby regulating the harvest season, the growth regulants have indeed opened up an entirely new field for agricultural chemicals.

An object of the present invention is to provide a process for thinning fruit plants, such as citrus, stone and pome fruits, small fruits and nuts, in which a chemical material may be employed over a relatively wide range of concentrations without danger of over-thinning, as well as causing foliage and fruit damage. Another object of the invention is to provide a process of thinning fruits with a chemical agent which can effectively be applied to the trees over a relatively long period of time beginning with full bloom.

Yet another object of the invention is to provide a process for adjusting the rate and timing of abscission of undesirable late flowers and fruitlets prior to mechanical harvesting of mature crops.

A still further object of the invention is to provide a process for controlling the rate of final development and maturation of crops so as to regulate the timed abscission of the mature fruit, vegetables, nuts or berries.

A still further object of the invention is to provide a process for delaying the onset of normal maturation processes, such as, senescence or defoliation, thereby providing continued vegetative growth, as well as more intensely colored foliage.

Other objects and many of the attendant advantages of this invention will be readily appreciated as the same becomes better understood by reference to the following detailed description.

Briefly, this invention relates to a method for regulating the growth of plants, said method comprising the step of treating growing plants with a material of the group consisting of those compounds represented by one of the following formulae:

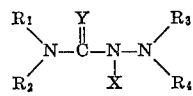

where $R_1$–$R_4$ can be unsubstituted or substituted $C_1$–$C_{30}$ hydrocarbyl, preferably $C_1$–$C_{10}$, and X can be hydrogen, or unsubstituted or substituted $C_1$–$C_{30}$ hydrocarbyl, and Y can be O or S.

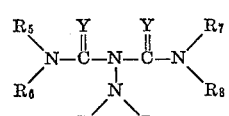

where $R_5$–$R_{10}$ can be H, or unsubstituted or substituted hydrocarbyl; and Y can be O or S, and combinations thereof, in a concentration and amount sufficient to alter the growth characteristics of said plants.

with a limited food supply may be more susceptible than those with an abundant supply so that the elimination of clusters where two or more fruits have set on the same spur can be explained on the basis of competition for food; that is, the fruitlets having the greatest advantage The material which we have discovered to possess the above-mentioned desirable properties is represented by one of the following formulae:

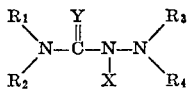

where $R_1$–$R_4$ can be unsubstituted or substituted $C_1$–$C_{30}$ hydrocarbyl, preferably $C_1$–$C_{10}$, and X can be hydrogen, or unsubstituted or substituted $C_1$–$C_{30}$ hydrocarbyl, preferably $C_1$–$C_{10}$, and Y can be O or S.

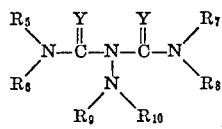

where $R_5$–$R_{10}$ can be H, or unsubstiuted or substituted hydrocarbyl; and Y can be O or S, and combinations thereof. Typical $R_1$–$R_{10}$ hydrocarbyl groups include: (1) saturated or unsaturated, acyclic or cyclic, aliphatics such as, e.g., ethyl, propargyl, cyclohexyl, cyclohexenyl, etc.; and (2) aromatic or heteroaromatic radicals such as phenyl, pyridyl, etc.

These compounds and their methods of preparation are described in a copending case bearing Ser. No. 821,975 which was filed on May 5, 1969, now abandoned, in the name of James Zielinski and entitled "Semicarbazide and Biuret Derivatives and Their Use as Agricultural Pesticides and Animal Health Agents."

The compounds may be applied to the plants any time throughout the growing season, depending on the type of effect desired, in a number of ways. When used, the semicarbazides, biurets and mono- or dithiobiurets, are preferably formulated with a suitable inert carrier or diluent thereof.

The term "carrier" or "diluent" as used herein means a material, which can be inorganic or organic and synthetic or of natural origin, with which the active semicarbazides and mono- or dithiobiurets are mixed or formulated to facilitate its storage, transport, and handling and application of the plants or fungi to be treated. The carrier is preferably biologically and chemically inert and, as used, can be a solid or fluid. When solid carriers are used, they are preferably particulate; however, other shapes and sizes of solid carrier can be employed as well. Such preferable solid carriers can be natural occurring minerals, although subseqeuntly subjected to grinding, sieving, purification, and/or other treatments, including for example, gypsum; tripolite diatomaceous earth; mineral silicates such as mica, vermiculite, talc, and pyrophyllite, clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° F. to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active thiosemicarbazide and mono- or dithiobiuret ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active thiosemicarbazide and mono- or dithiobiuret ingredients and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the thiosemicarbazides, biurets, and mono- or dithiobiurets mixed with a dispersing, i.e., deflocculating or suspending agent, and, if desired, a finely divided solid carrier and/or a wetting agent. The thiosemicarbazides, biurets, and mono- or dithiobiurets can be in particulate form or adsorbed on the carrier and preferably constitute at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending properties, as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed sulfonic acid, for example, the products known as "Tamol 731" are also suitable.

The wetting agents used can be nonionic type surfactants, as for example, the condensation products of fatty acids containig at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

The final wettable powder should preferably have an average particle size of 5–10μ.

Where the toxicant itself is a liquid, there materials can be sprayed on crops or fungi without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

The treatment rates range from .1 to 3 lbs./acre of the active ingredient with a preferred range of .1 to ⅓ lbs./acre. The materials are applied at optimum timing so as to have the desired effect on the particular crop. Therefore, applications may be made once or more than once depending on plant species or varieties, cultural conditions, environmental conditions for the particular type of effect desired.

The present invention is further illustrated in greater detail by the following examples.

EXAMPLE 1

Potatoes were treated with 1,1,5,5 - tetramethyl - 3 - dimethylaminodithiobiuret at one half pound per acre as a foliar spray and applications were repeated at weekly intervals. The active material was formulated as a 50% wettable powder, having the following composition:

| | Percent |
|---|---|
| 1,1,5,5-tetramethyl-3-dimethylaminodithiobiuret | 50 |
| Kaolin clay | 19 |
| Calcium stearate | 20 |
| Polymerized organic salt of an alkylaryl sulfonic acid | 5 |
| Alkylaryl polyoxy ethylene glycol | 4 |
| Glycerol phthalate resin | 2 |

The following results were observed eight weeks after the initial application: The potato plants treated at one half pound per acre with said compound exhibited the following growth regulant effects as compared to untreated controls: intense green coloration, greatly increased vegetative growth and significantly reduced leaf size.

At the termination of the tests, the potatoes treated at one half pound per acre with said compound, remained in a vegetative state while the controlled plants exhibited the normal senescence state of terminal growth at the end of the season. The treated plants produced almost no tubers and those tubers that were produced were uniformly small in size.

EXAMPLE 2

Apple seedling were treated with said compound at 600 parts per million active ingredient concentrations in the same formulation in water as Example 1, directly onto the foliage to run off and placed in the greenhouse for subsequent observation. It was noted that the growth of the treated seedlings was retarded compared to controls thereby giving a stunted appearance to the so-treated apple seedlings.

EXAMPLE 3

Young peach, apple and cherry trees were treated with 1,1,5,5-tetramethyl - 3 - dimethylaminodithiobiuret at 300 to 600 parts per million active ingredient concentration, in the same formulation in water as Example 1, directly onto the foliage to run off, and placed in the greenhouse for subsequent observation. Within one week the trees exhibited various plant hormonal effects, malformed leaves, uneven surface and manifested differences in intensity and shade of the green color.

EXAMPLE 4

McIntoch, Cortland, Golden Delicious and Red Delicious apple trees were treated with 1,1,5,5-tetramethyl-3-dimethylaminodithiobiuret at one half pound per acre active ingredient concentration in the formulation as given in Example 1, per hundred gallons of water, directly onto the foliage, on a weekly application schedule for eight weeks.

It was noted that the 1,1,5,5-tetramethyl-3-dimethylaminodithiobiuret treatments had caused reduced fruit set on the apple trees with only four–five apples developing on each tree, whereas the check trees had the normal load of fruit.

EXAMPLE 5

Potatoes were treated with 1,1,5,5-tetramethyl-3-dimethylaminodithiobiuret at one half pounds per acre active ingredient concentration, in the formulation as given in Example 1, per hundred gallons of water directly onto the foliage, on a weekly application schedule for nine weeks.

The treated potatoes showed reduced terminal leaf size and were of deeper green coloration and more vegetative in growth than those potato plants which were not treated. Potato tuber yields were significantly reduced, as shown by the total final harvest data below for four replicate plots:

| | Total yield (lb.) |
|---|---|
| Treated plot | 175 |
| Control | 473 |

EXAMPLE 6

Tomato plants were treated with 1,1,5,5-tetramethyl-3-dimethylaminodithiobiuret at one quarter pound per acre active ingredient concentration in the formulation given in Example 1, per 100 gallons of water. The same treatment was continued on a weekly basis for ten applications.

It was noted that the treated tomato plants had fewer number of fruits and smaller fruit than checked plants. The leaves on the treated plants were curled in some instances and the treated plants were greener and more vegetative in appearance.

EXAMPLE 7

0.2 grams of a one percent suspension of 1,1,5,5-tetramethyl-3-dimethylaminodithiobiuret and 1,1,4,4 - tetramethylthiosemicarbazide in lanolin were placed around the lower stem of each of two replicate five-week old Deltapine cotton plants.

The abscission of the previously debladed lowest petiole on each plant was determined seven days following treatment, by application of a 5 gm. pressure to the outer portion of the petiole. The treated plants exhibited accelerated petiole abscission as shown by the following data for each replicate:

| Treatment: | Observed effect |
|---|---|
| Lanolin only control | None, none. |
| 1,1,5,5-tetramethyl-3-dimethylaminodithiobiuret. | Abscissed, none. |
| 1,1,4,4-tetramethylthiosemicarbazide. | Abscissed, abscissed. |

EXAMPLE 8

1,1,5,5-tetramethyl - 3 - dimethylaminodithiobiuret formulated as in Example 1, and suspended in water, was applied directly to the foliage of trees of two peach varieties under the conditions shown in the table below, to four replicate trees each, to run-off.

1,1,5,5 - tetramethyl-3-dimethylaminodithiobiuret provided desirable peach thinning activity as indicated in the table below:

TABLE I

| Variety | Application rate (p.p.m.) | Tree physiological stage | Percent[1] |
|---|---|---|---|
| Halford | 100 | Petal fall | 40.0 |
| Do | 250 | do | 40.5 |
| Do | 500 | do | 30.3 |
| Do | 100 | 4 mm. ovule | 37.4 |
| Do | 250 | do | 34.8 |
| Do | 500 | do | 25.0 |
| Do | 100 | 8 mm. ovule | 35.3 |
| Do | 250 | do | 23.1 |
| Do | 500 | do | 10.9 |
| Controls | | | 39.7 |
| Johnson | 100 | Petal fall | 39.2 |
| Do | 250 | do | 55.6 |
| Do | 500 | do | 41.4 |
| Do | 100 | 4 mm. ovule | 40.8 |
| Do | 250 | do | 58.4 |
| Do | 500 | do | 30.7 |
| Do | 100 | 8 mm. ovule | 46.1 |
| Do | 250 | do | 36.8 |
| Do | 500 | do | 19.2 |
| Controls | | | 43.8 |

[1] Original fruit remaining after 5 weeks treatment.

EXAMPLE 9

In field studies, 1,1,5,5-tertamethyl-3-dimehtylaminodithiobiuret formulated as in Example 1, was applied directly to the foliage of six replicate trees of Redhaven variety at 8.5 mm. average ovule length, to run-off.

The treated and controlled trees were thinned by hand to commercial bearing levels five weeks later and the numbers of fruit removed were recorded. The compound significantly reduced the required hand thinning as shown in the table below. All trees were harvested and the fruit counted and weighed at the end of the growing season. The trees receiving the treatments with the subject compound produced fruit of equivalent weight and numbers as controls:

| Application rate (p.p.m.) | Number of peaches removed by hand thinning | Average fruit yield per tree ||||
|---|---|---|---|---|---|
| | | Total count | Percent of control | Total weight (lbs.) | Percent of controls |
| 300 | 319 | 709 | 107 | 164 | 109 |
| Control | 537 | 663 | | 151 | |
| 400 | 161 | 672 | 97 | 157 | 100 |
| Control | 394 | 694 | | 157 | |

Similar studies have shown a positive thinning response to 1,1,5,5 - teramethyl - 3 - dimethylaminodithiobiuret by these additional peach varieties: Loring, Ranger, Triogem, Alberta, Ambergem, Early Red, Rio-Oso-Gem, Redskin, Baby Gold, Baker SOLG, Sunhigh, Daly, Early Amber, Bray's Late White, Autumn, Comancha.

EXAMPLE 10

0.2 gm. of a 1% suspension of 1,1,5,5-tetramethyl-3-dimethylaminodithiobiuret, 1,1,5,5-tetramethyl-3-(N-methyl anilino) dithiobiuret, and 1,1-dimethyl-3-dimethyl-amino 5-ethyl-5-phenyl dithiobiuret in lanolin was placed around the lower stem of each of two replicate five-week-old Deltapine cotton plants. Nine days later, the abcission of the previously debladed lowest petiole on each plant was determined by application of a 5 gm. pressure to the outer portion of the petiole. The plants treated with each compound shown below exhibited accelerated petiole abscission as shown by the data below for each replicate:

Treatment: Observed effect
Control lanolin only _____ None, none.
1,1,5,5, - tetramethyl-3-dimethylamino-dithiobiuret. Abscissed, abscissed.
1,1,5,5 - tetramethyl - 3 - (N-methyl anilino) dithiobiuret. Do.
1,1 - dimethyl-3-dimethylamino 5-ethyl-5-phenyl dithiobiuret. Do.

In summary, the unique properties of these compounds are useful as abscission-control agents to adjust the rate and timing of abscission of flowers, fruits (including citrus-stone, pome fruits), nuts, berries, floral and vegetable crops; as mature crop harvest aids applied to later stages of the maturing crop to control the rate of final development and maturation of the crop and regulate the timed abscission of the mature fruit, vegetables, nuts or berries; as foliar maturation control agents applied to forage, turg, horticultural and ornamental plants or crops to delay the onset of normal maturation processes such as senescence or defoliation thereby providing continued vegetative growth and/or more intensely colored foliage so as to provide higher yields of forage crops and more desirable foliage on other plants and turfs; as crop-pruning agents applied to cucurbits and other vine crops and indeterminate vegetables several days or weeks prior to harvesting to stimulate abscission of young fruit and flowers, leaving only the earlier setting or maturing fruit for subsequent harvest during a concentrated time period; as plant sex expression modifiers applied to cucurbits to increase the ratio of female to male flowers thereby increasing subsequent crop yields; as a preventative of sucker shoots from growing on tobacco plants thereby stepping up the prime leaf yield so as to reduce the grower's cost; as a preventative of wrinkling and shrinking or softening of fresh vegetables when stored or shipped; as a preventative of the sprouting of onions and potatoes when in storage.

The plant growth regulants mentioned hereinabove, although safe to handle, and operative under very favorable conditions over a longer period of application time, nevertheless must be employed within a relatively narrow limit of concentration or else overthinning, epinasty and other serious damage to foliage and shoots will occur.

What is claimed is:

1. A method for controlling the abscission of buds, flowers and fruits of plants by treating said plants with a composition consisting essentially of an effective amount of 1,1,5,5-tetramethyl-3-dimethylaminodithiobiuret in admixture with an inert diluent.

2. A method according to claim 1 wherein 1,1,5,5-tetramethyl-3-dimethylaminodithiobiuret is applied to said plants at an appropriate time and in a sufficient concentration prior to the harvest date thereby controlling the abscission of mature fruit of said plant.

3. A method for controlling the onset and rate of development of maturation and onset of senescense thereby increasing the continued vegetative growth and intensely colored foliage of said plants by applying to said plants the composition of claim 1.

4. A method according to claim 1 wherein said compound is applied in an amount ranging from .1 to 3 lbs./acre.

References Cited

UNITED STATES PATENTS 3,556,766  1/1971  Mitchell _____ 71—120
3,189,431  6/1965  Salzberg _____ 71—120
3,318,680  5/1967  Levitt _____ 71—99

JAMES O. THOMAS, JR., Primary Examiner

U.S. Cl. X.R.

71—78, 99, 119, 120; 99—154